Jan. 19, 1960 F. LANDGRAF 2,921,435
DIRECTIONAL CONTROL FOR AIRCRAFT
Filed Oct. 7, 1957 3 Sheets-Sheet 1
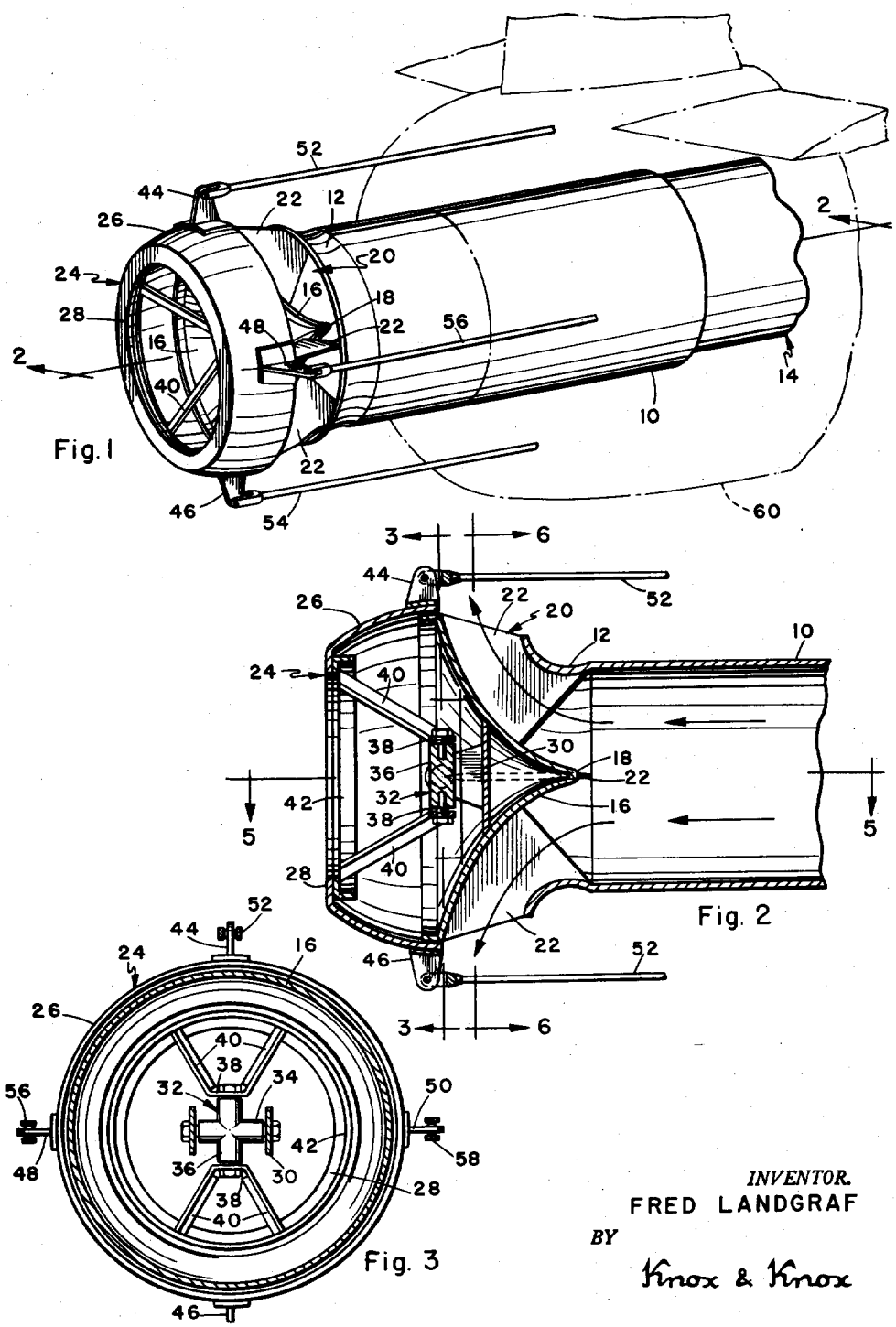
INVENTOR.
FRED LANDGRAF
BY
Knox & Knox

*INVENTOR.*
FRED LANDGRAF
BY
Knox & Knox

United States Patent Office 2,921,435
Patented Jan. 19, 1960

2,921,435
DIRECTIONAL CONTROL FOR AIRCRAFT

Fred Landgraf, San Diego, Calif., assignor to Ryan Aeronautical Company, San Diego, Calif.

Application October 7, 1957, Serial No. 688,608

4 Claims. (Cl. 60—35.54)

The present invention relates generally to aircraft control and more particularly to a directional control system for aircraft.

The device is primarily designed for use in vertical-take-off aircraft of the type which maintains a normal horizontal attitude during vertical flight by using the main thrust component to generate direct lift. In hovering or vertical flight, the normal control surfaces such as elevators, rudder and ailerons are ineffective due to lack of a normal slipstream, so other means must be used to control pitch and yaw of the aircraft until forward motion restores the effectiveness of the control surfaces. The device described herein uses gases from a gas generator and diverts the gases in various directions, usually from an extremity of the aircraft, the direction of flow of the gases being controlled by the pilot to stabilize the aircraft and provide pitching and yawing moments. The gas generator may be a separate unit, or the exhaust from a propeller turbine or turbojet may be used, if the aircraft possesses such an engine.

The primary object of this invention is to provide a directional control device which utilizes gases from any suitable gas generator, the term being used in its current broadest sense, and diverts the gases in any chosen direction for controlling pitch and yaw of the aircraft, the term directional control being also interpreted broadly to include drift-producing capabilities such as required in landing.

Another object of this invention is to provide a directional control device which operates independently of the main thrust component of the aircraft.

Another object of this invention is to provide a directional control device which has no undesirable effect on the performance of the aircraft when the device is inoperative.

Another object of this invention is to provide a directional control device which can be used in conjunction with the normal flight controls of the aircraft to supplement or replace those controls.

Finally, it is an object to provide a directional control device of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the appended claims, and illustrated in the accompanying drawings which form a material part of this disclosure, and in which:

Figure 1 is a perspective view of the device, a portion of an aircraft being indicated in broken line;

Figure 2 is an enlarged fragmentary sectioned view taken on the line 2—2 of Figure 1;

Figure 3 is a sectional view taken on the line 3—3 of Figure 2;

Figure 4:
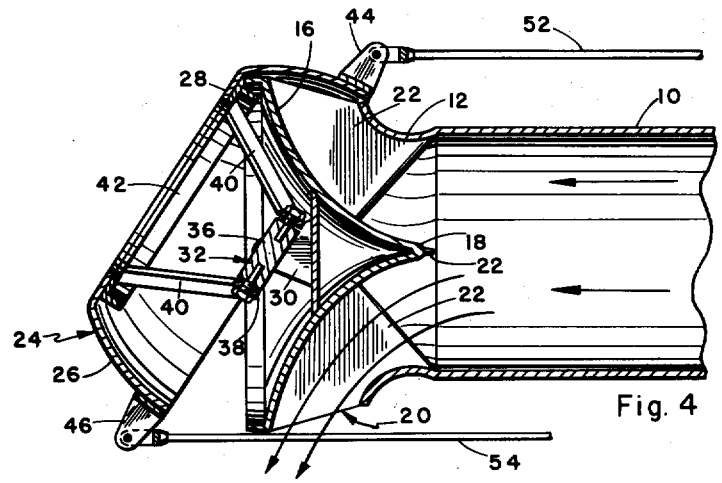
Figure 4 is a sectional view similar to Figure 2 but showing the device in offset thrust position.
Figure 5:
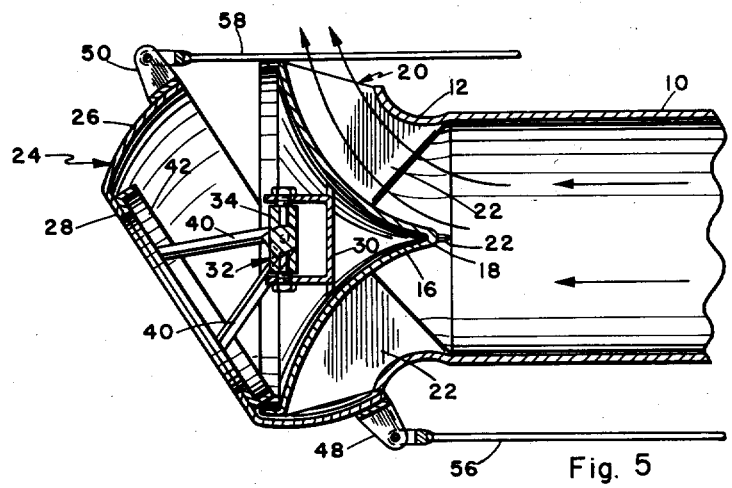
Figure 5 is a sectional view taken on the line 5—5 of Figure 2, showing the device in offset thrust position.
Figure 6:
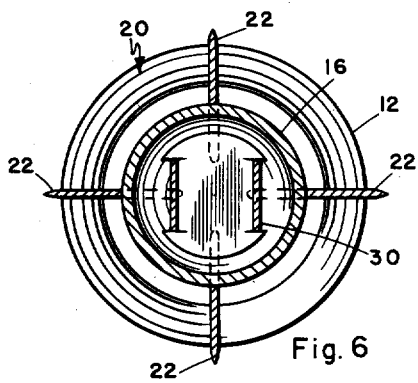
Figure 6 is a sectional view taken on the line 6—6 of Figure 2.

Referring now to Figures 1–6 of the drawings, the device comprises a cylindrical duct 10 having a flared end 12, the other end of the duct being connected to a gas generator 14, which is indicated fragmentarily in Figure 1. Since various types of gas generators may be used, the tail pipe or gas exhaust portion shown is typical and is not limited to a specific type. Spaced from and concentric with the flared end 12 is a deflector cone 16 having a concave conoidal portion, the apex 18 of which extends into the flared end, so that the deflector cone and flared end, connected as they are by the vanes 22, together define an outwardly flaring annular nozzle 20. The deflector cone 16 is solely supported by these vanes 22 which are four in number, arranged in cross formation, and generally streamlined in cross-section to present minimum resistance to the gas flow. The term "cone" is used in its broadest sense.

Mounted behind the deflector cone 16 is a baffle 24 comprising a truncated spheroidal shell 26, the larger diameter end of which is open and fits closely around the periphery of the deflector cone, the smaller end of said shell having an annular plate portion 28. The baffle 24 is universally mounted for movement about its center of radius which is located on the axis of the annular nozzle 20, the universal mounting including a substantially U-shaped bracket 30 fixed inside the deflector cone 16. Pivotally mounted in the bracket 30 is cruciform member 32, pivotal on the axis of one of its cross arms 34, while pivotally attached to the ends of the other cross arm 36 are two brackets 38, each having a pair of outwardly and rearwardly diverging legs 40. The ends of the legs 40 are fixed to a reinforcing ring 42 which, in turn, is secured to the flat portion 28. The cruciform member is, of course, located at the center of radius of the shell 26 so that the baffle 24 is universally movable about that center on the two axes of the cruciform member.

Fixed to the outer periphery of the shell 26 are four lugs or arms extending radially outwardly therefrom, said arms being substantially in co-planar relationship with the support vanes 22. For purposes of description, these arms will be referred to as the upper arm 44, lower arm 46, right arm 48 and left arm 50. Pivotally attached to the arms 44, 46, 48 and 50 are control rods 52, 54, 56 and 58, respectively, the control rods being extended to suitable pilot actuated controls.

In Figure 1 the device is shown installed in the rear fuselage of an aircraft, which is indicated in broken line at 60. In this position the device has the greatest possible reaction moment and the gases are exhausted well clear of the aircraft surfaces.

The neutral position of the device is shown in Figures 1, 2 and 3 and in this position, the gases exhaust through the entire annular nozzle 20, so that there is no directional reaction on the aircraft. In order to obtain a pitching moment, the upper and lower control rods 52 and 54 are actuated, while to provide a yawing moment the right and left control rods 56 and 58 are used. In Figure 4, the upper control rod 52 is pulled forward so that the baffle 24 is tilted and the shell 26 covers the upper portion of the annular nozzle 20. Thus the gases must exhaust downwardly as shown by the directional arrows to provide an upward or pitching reaction. Similarly, in Figure 5, the right control rod 56 is shown pulled forward to tilt the baffle 24 so that the shell 26 covers the right side portion of the annular nozzle 20, causing the gases to be exhausted from the left side and provide a yawing reaction. Operation of the various control rods, either individually or in combination, will result in a reactive thrust in any desired direction.

The device as shown causes a decrease in total gas exit area whenever the baffle 24 is moved from its neutral position. This, in turn, increases the gas exhaust velocity and the thrust reaction, but also causes slight back pressure in the gas generator. Should this be undesirable, the structure is easily modified to enable the total gas exit area to be constant during operation of the device.

Figure 7:
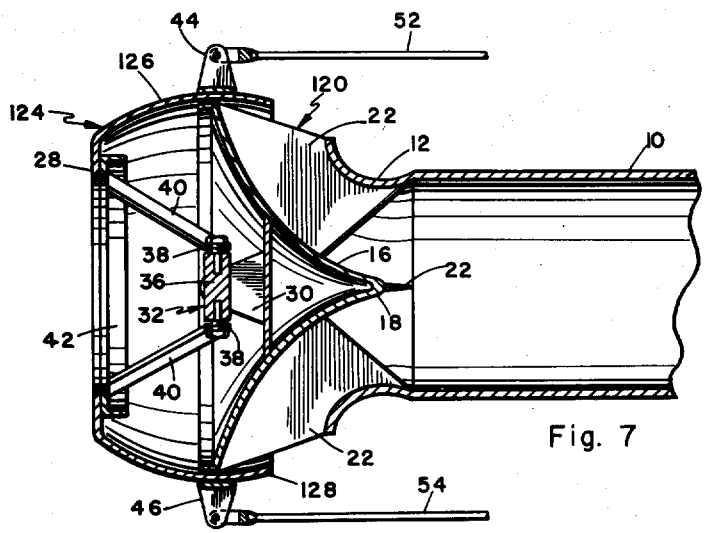
Figure 7 is a sectional view similar to Figure 2, showing a modified form of the device.
Figure 8:
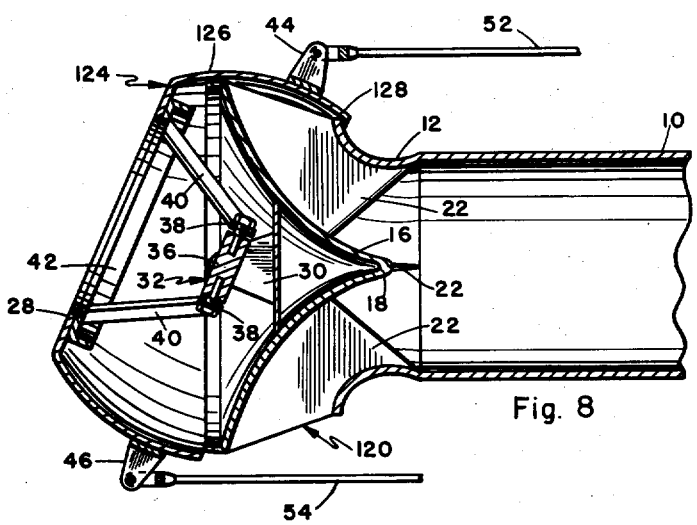
Figure 8 is a sectional view similar to Figure 7, showing the device in offset thrust position.

The modified structure is shown in Figures 7 and 8, the only differences being in the proportions of the annular nozzle and the baffle. The annular nozzle 120 is slightly wider in its fore and aft dimension than the nozzle 20 previously described and the baffle 124 has a shell portion 126 which has an extended edge 128 continuing beyond the maximum spheroidal diameter, so that it overlaps substantially one half of the area of the nozzle 120 when in neutral position. All other structure is mechanically and functionally identical to that shown in Figures 1–6. In this form the extended edge 128 of the shell 126, when the shell is tilted, begins to close a portion of the annular nozzle 120. However, the diametrically opposite portion of the shell 126 gradually recedes to open another portion of the nozzle 120, so that the total area is virtually unchanged and the operating characteristics of the gas generator are unaffected.

The device may be connected to operate in conjunction with the normal flying controls to supplement those controls in forward flight, or may be used as an independent system operative in hovering or vertical flight only.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

Having described my invention, what I claim as new and desire to secure by Letters Patent is:

1. A directional control for aircraft, comprising: a gas generator; a generally cylindrical duct having a flared end; the other end of said duct communicating with said gas generator; a fixed deflector cone spaced from and concentric with said flared end and defining therewith an outwardly flaring, radially extending annular nozzle; said deflector cone having its apex projecting upstream of the gas flow; a baffle universally pivotally mounted on said deflector cone at the longitudinal axis of said nozzle; said baffle having an imperforate annular portion concentric with and extending outside said nozzle and being tiltable to close selected portions of said nozzle; and actuating means operatively connected to said baffle to tilt said baffle.

2. A directional control for aircraft, comprising: a gas generator; a generally cylindrical duct having a flared end; the other end of said duct communicating with said gas generator; a fixed deflector cone spaced from and concentric with said flared end and defining therewith an outwardly flaring, radially extending annular nozzle; said deflector cone having its apex projecting upstream of the gas flow; a plurality of generally radial vanes fixed to and between said flared end and said deflector cone to hold said cone in spaced relation with the flared end; a baffle of truncated spheroid form and universally pivotally mounted at the longitudinal axis of said nozzle; and pilot actuated control means operatively connected to said baffle to tilt said baffle and to close selected portions of said nozzle.

3. A directional control for aircraft, comprising: a gas generator; a generally cylindrical duct having a flared end; the other end of said duct communicating with said gas generator; a fixed deflector cone spaced from and in fixed relation with said flared end and defining therewith an outwardly flaring, radially extending annular nozzle; said deflector cone having its apex projecting upstream of the gas flow; a baffle of truncated spheroid form and universally pivotally mounted at the longitudinal axis of said nozzle; and pilot actuated control means operatively connected to said baffle to tilt said baffle and to close selected portions of said nozzle, the total outlet area of said nozzle being unobstructed by said baffle when the baffle is in neutral position with the axis of the baffle aligned with the axis of said duct.

4. A directional control for aircraft, comprising: a gas generator; a generally cylindrical duct having a flared end; the other end of said duct communicating with said gas generator; a fixed deflector cone spaced from and in fixed relation with said flared end and defining therewith an outwardly flaring, radially extending annular nozzle; said deflector cone having its apex projecting upstream of the gas flow; a baffle of truncated spheroid form and universally pivotally mounted at the longitudinal axis of said nozzle; and pilot actuated control means operatively connected to said baffle to tilt said baffle and to close selected portions of said nozzle; said baffle, when the axes of said baffle and said duct are axially aligned, covering substantially one half of the outlet area of the nozzle.

References Cited in the file of this patent

UNITED STATES PATENTS

| | | |
|---|---|---|
| 2,137,385 | Butler | Nov. 22, 1938 |
| 2,518,697 | Lee | Aug. 15, 1950 |
| 2,620,622 | Lundberg | Dec. 9, 1952 |
| 2,637,164 | Robson et al. | May 5, 1953 |
| 2,686,567 | Da Silva Costa | Aug. 17, 1954 |
| 2,857,119 | Morguloff | Oct. 21, 1958 |

FOREIGN PATENTS

| | | |
|---|---|---|
| 600,397 | Great Britain | Apr. 7, 1948 |